US010831768B2

(12) United States Patent
Wei et al.

(10) Patent No.: US 10,831,768 B2
(45) Date of Patent: *Nov. 10, 2020

(54) MULTI-STEP VALIDATION OF CONTENT ITEMS BASED ON DYNAMIC PUBLISHER REQUIREMENTS

(71) Applicant: Microsoft Technology Licensing, LLC, Redmond, WA (US)

(72) Inventors: Yawen Wei, Sunnyvale, CA (US); Kaiyang Liu, Bellevue, WA (US); Jie Xiao, Sunnyvale, CA (US); Dayun Li, Sunnyvale, CA (US); Nihar Mehta, Sunnyvale, CA (US); Divye Khilnani, Sunnyvale, CA (US); Mingyuan Zhong, Sunnyvale, CA (US); Siyu You, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 106 days.

This patent is subject to a terminal disclaimer.

(21) Appl. No.: 15/445,781

(22) Filed: Feb. 28, 2017

(65) Prior Publication Data

US 2018/0246891 A1 Aug. 30, 2018

(51) Int. Cl.
*G06F 16/2457* (2019.01)
*G06F 16/23* (2019.01)
(Continued)

(52) U.S. Cl.
CPC ........ *G06F 16/24578* (2019.01); *G06F 16/23* (2019.01); *G06Q 10/10* (2013.01); *G06Q 30/02* (2013.01); *G06Q 30/0277* (2013.01)

(58) Field of Classification Search
CPC ............... G06F 3/0482; G06F 16/9535; G06F 16/24575; G06F 16/951; G06F 16/248;
(Continued)

(56) References Cited

U.S. PATENT DOCUMENTS 8,676,803 B1\* 3/2014 Leung ................. G06F 16/5866
707/737
2007/0041362 A1\* 2/2007 Lam ...................... H04L 63/104
370/352
(Continued)

OTHER PUBLICATIONS

"Non Final Office Action Issued in U.S. Appl. No. 15/445,451", dated Jun. 28, 2019, 15 Pages.
(Continued)

*Primary Examiner* — Aleksandr Kerzhner
*Assistant Examiner* — Maher N Algibhah
(74) *Attorney, Agent, or Firm* — Hickman Palermo Becker Bingham LLP

(57) ABSTRACT

A content item generation system which implements techniques for selecting and identifying content items to return in response to a request is described. For example, the content item generation system may separate requirements included with a request into first and second sets of requirements. The first set of requirements may be used to identify which content items or content item campaigns may be suitable to respond to the request. The second set of requirements may be used to determine whether items associated with the selected content items or content item campaigns correspond to technical requirements specified in the request.

20 Claims, 4 Drawing Sheets

(51) Int. Cl.
*G06Q 30/02* (2012.01)
*G06Q 10/10* (2012.01)

(58) Field of Classification Search
CPC ............... G06F 16/24578; G06F 16/23; G06F 16/2457; H04L 67/42; H04W 88/02; G06Q 30/0277; G06Q 30/02; G06Q 10/10

See application file for complete search history.

(56) References Cited

U.S. PATENT DOCUMENTS

| | | | |
|---|---|---|---|
| 2008/0103795 A1 | 5/2008 | Jakubowski et al. | |
| 2008/0301093 A1* | 12/2008 | Haugen | G06Q 30/02 |
| 2010/0017388 A1* | 1/2010 | Glover | G06F 16/9535 |
| | | | 707/E17.001 |
| 2010/0205202 A1* | 8/2010 | Yang | G06F 16/532 |
| | | | 707/767 |
| 2010/0293049 A1 | 11/2010 | Maher et al. | |
| 2010/0293063 A1 | 11/2010 | Atherton et al. | |
| 2011/0126246 A1* | 5/2011 | Thomas | G06F 3/0481 |
| | | | 725/93 |
| 2012/0239638 A1* | 9/2012 | Bennett | G06F 16/5838 |
| | | | 707/710 |
| 2013/0246169 A1 | 9/2013 | Berry et al. | |
| 2013/0282642 A1* | 10/2013 | Claux | G06N 5/02 |
| | | | 706/47 |
| 2014/0153835 A1* | 6/2014 | Pritt | G06K 9/00664 |
| | | | 382/203 |
| 2014/0172961 A1* | 6/2014 | Clemmer | H04L 65/605 |
| | | | 709/203 |
| 2015/0095154 A1* | 4/2015 | Kannan | G06F 16/13 |
| | | | 705/14.55 |
| 2016/0154862 A1* | 6/2016 | Gabbai | G06F 3/0488 |
| | | | 707/722 |
| 2016/0182617 A1* | 6/2016 | Mengle | H04L 47/00 |
| | | | 709/219 |
| 2016/0188600 A1* | 6/2016 | Owens | G06Q 30/02 |
| | | | 707/734 |
| 2017/0006252 A1* | 1/2017 | Patel | G11B 27/005 |
| 2017/0249058 A1* | 8/2017 | Fisher | G06F 16/41 |
| 2018/0189821 A1* | 7/2018 | Masson | G06Q 30/0246 |
| 2018/0218405 A1* | 8/2018 | Lewis | G06Q 30/0269 |
| 2018/0285932 A1 | 10/2018 | Andrianakou et al. | |

OTHER PUBLICATIONS

"Final Office Action Issued in U.S. Appl. No. 15/445,451", dated Dec. 16, 2019, 20 Pages.

"Applicant Initiated Interview Summary Issued in U.S. Appl. No. 15/445,451", dated Mar. 9, 2020, 3 Pages.

"Non Final Office Action Issued in U.S. Appl. No. 15/445,451", dated Mar. 20, 2020, 25 Pages.

* cited by examiner

MULTI-STEP VALIDATION OF CONTENT ITEMS BASED ON DYNAMIC PUBLISHER REQUIREMENTS

RELATED CASES

This application is related to the following applications: (1) U.S. patent application Ser. No. 15/445,715, "Using Status Indicators in an Item Caching Environment," filed on Feb. 28, 2017; (2) U.S. patent application Ser. No. 15/445, 742, "Reducing Load to Downstream Services by Filtering Requests," filed on Feb.; 28, 2017; (3) U.S. patent application Ser. No. 15/445,791, "Progress Tracking for Requests Made Through an Intermediary," filed on Feb. 28, 2017; and (4) U.S. patent application Ser. No. 15/445,451, "Increasing Coverage of Responses for Requests through Selecting Multiple Content Items," filed on Feb. 28, 2017. These applications are hereby incorporated by reference in their entirety, for all purposes.

TECHNICAL FIELD

The present disclosure relates to data processing and, more specifically, to facilitate the processing of media items to create content items. SUGGESTED GROUP ART UNIT: 2161; SUGGESTED CLASSIFICATION: 707/756.

BACKGROUND

The availability of various content items on the Internet allows access to information in bulk. However, the sheer volume of content items available does not increase the usefulness of the content items. The information presented in the content items themselves must be suitable for each particular user. For example, a user interested in learning about current political developments may request content items. Content items with information on living and style may be irrelevant to the user, even though the same content item may be enjoyable for another user.

Other than matching relevant content items to users' requests, the volume of content items from different providers has also made it difficult to select and provide content items in a timely manner. For example, if a content item is not provided within certain time criteria, a user may have a poor Website experience (e.g., slowly loading Web pages, incorrectly rendered Web pages) or other undesirable effects. Users may grow frustrated and choose to never view content items from that Website again, even if the content items are particularly relevant.

From the perspective of a request processing system, it is difficult to provide both timely and relevant content items to users. As one example, there may be one or more requirements that a content item returned in response to the request must comply with. Selecting, creating, and transmitting content items according to the requirements all introduce latency to the request processing system, which reduces the likelihood of the request processing system being able to select the best content item in response to a request in a timely manner.

Therefore, it is desirable to have methods to identify relevant content items, while still considering all the requirements included with a request.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
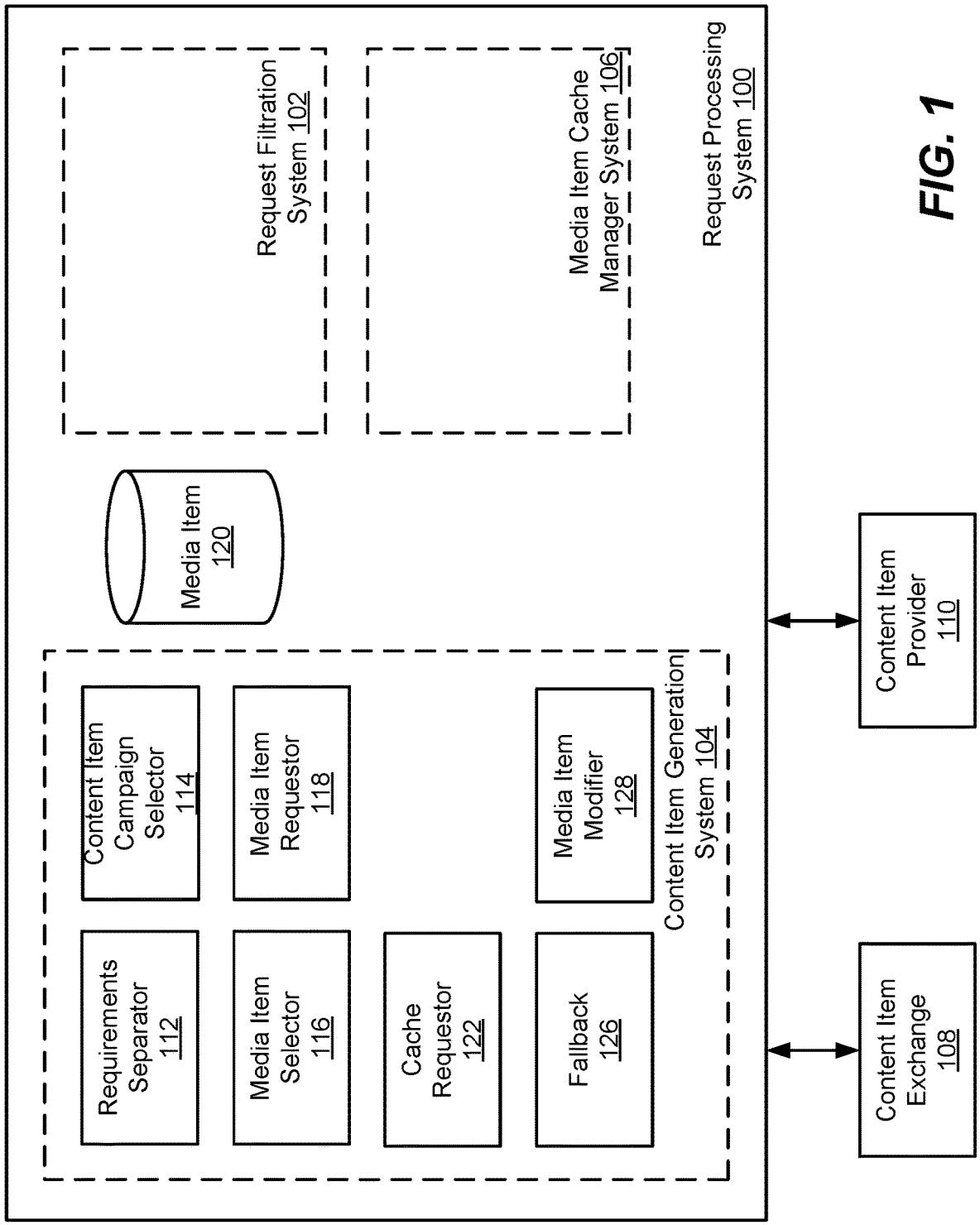
FIG. 1 illustrates a content item generation system in which the techniques described may be practiced according to certain embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline. The outline and headings used in the outline are provided merely for reference purposes. Features discussed following each heading do not limit the features as being required by a specific embodiment identified by each heading and do not limit the features as solely belonging to any specific embodiment identified by each heading.

1.0 GENERAL OVERVIEW
        1.1 NATIVE CONTENT ITEMS
        1.2 MEDIA ITEMS
    2.0 STRUCTURAL OVERVIEW
    3.0 EXAMPLE METHOD FOR MULTI-STEP VALIDATION OF CONTENT ITEMS
    4.0 EXAMPLE EMBODIMENT OF A CONTENT ITEM GENERATION SYSTEM FOR MULTI-STEP VALIDATION OF CONTENT ITEMS
    5.0 EXAMPLE METHOD FOR SELECTING MULTIPLE CONTENT ITEMS IN RESPONSE TO A REQUEST
    6.0 EXAMPLE EMBODIMENT OF A CONTENT ITEM GENERATION SYSTEM FOR SELECTING MULTIPLE CONTENT ITEMS IN RESPONSE TO A REQUEST
    7.0 IMPLEMENTATION EXAMPLE—HARDWARE OVERVIEW 1.0 General Overview A content item generation system is described herein which implements techniques for selecting and identifying content items to return in response to a request. For example, the content item generation system may separate requirements included with a request into first and second sets of requirements. The first set of requirements may be used to identify which content items or content item campaigns may be suitable to respond to the request. The second set of requirements may be used to determine whether items associated with the selected content items or content item campaigns correspond to technical requirements specified in the request.

In an embodiment, a request processing system includes a content item generation system that selects more than one content item in response to a request. By choosing more than one content item in response to the request, there may be built-in redundancy in the content item generation system if or when a selected content item fails. For example, a first set of requirements may be used to identify which content items or content item campaigns may be suitable to respond to the request. The content item campaigns may be ranked, to determine which content item campaign may be the most suitable. After the content item generation system determines the content item campaigns that may satisfy the first set of requirements, the content item campaigns may still fail to satisfy the second set of requirements. When a particular content item fails a requirement of the second set of requirements, the request processing system may select another content item campaign that was previously determined to satisfy the first set of requirements to determine whether it passes the second set of requirements.

In an embodiment, a request processing system includes a content item generation system that uses a metadata lookup to determine whether a content item campaign includes one or more items that may be used to satisfy a request. A content item campaign is a set of media items that may be selected in response to a request to achieve a particular purpose. Some examples of purposes may include entertainment, advertisement, educational, or many other purposes. By using the metadata lookup, the content item generation system may determine various pieces of information on items associated with the content item campaign, such as what media items are associated with the content item campaign, the technical dimensions of each media item, where the media items may be retrieved from, and many other pieces of information. By performing the metadata lookup, the content item generation system may be able to select media items faster than it would take if the content item generation system were to retrieve information on all the media items associated with a content item campaign then determine their suitability by selectively analyzing and retrieving information on media items.

1.1 Native Content Items

The following is a sample use case of a request processing system used with requests for content items that are dynamically published on a Web page. Although the specification may employ examples using this sample embodiment discussed below, the principles as described herein are generally applicable to other types of systems where there are requests that need to be satisfied within (or regardless of) a particular time constraint.

In an embodiment, the request processing system 100 may be used to respond to requests where content items are used as part of a dynamically published Web page. These content items may also be known as native content items, an example type of which is advertisements. As an example, native content items are different than other content items since, instead of specifying the requirements for a single element to be displayed on a Web page, native content items include two or more media items that will be combined for display on a Web page. Each native content item may include different media item requirements (e.g., information specifying what media items with which types are needed and technical requirements for the media items). Further, requirements information may include targeting information (e.g., information specifying whether a content item should be returned) and, for media items used to generate the native content item, 1.2 Media Items Media items include any piece of media that may be displayed on a computer screen. Some examples of different types of media items include text, graphic, or video. Media items may also include additional information that is not displayable on a computer screen. Some examples include addressing information (e.g., a universal resource locator), identifying information on a content item provider that provided the media item, or other pieces of information.

A single native content item may include one or more media items. For example, media items may be associated with one or more types. The type for a media item defines where, for a native content item, the media item may be used. Some examples of types include an icon image, a logo image, a main image, a title, a call-to-action (CTA), a sponsor, a description, and many other types. Different requests for native content items may require one or more of these types to be satisfied. For example, a native content item request may include a requirement for a logo image, a title, and a sponsor.

Some examples of media item requirements in addition to type include a limit on the dimensions for a graphic element (e.g., pixel count, resolution, height, length, width), a text element (e.g., character count, text length), or a video element (e.g., pixel count, resolution, height, length, width, video quality, playback time). For example, the request processing system 100 may include two or more media items with the type of logo. This means that, for requests that require a logo to be included, the two or more media items may possibly satisfy the requirement. However, there may be size, color, theme, or other attributes where the two or more logos differ. Some logos may be wider, while other logos may be narrower. Based on the requirements included with the request, the proper logo may be selected. As another example, a request may require a length of 15 characters for a company name. If there is a media item that satisfies the length requirement (15 characters) and type requirement (is a company name), it may be selected as part of the response to the request.

Further, additional changes may be applied to a selected media item after its selection. For example, in addition to the length requirement, before the media item is displayed as part of a Web page, the font, color, media item size, or other attribute of the media item may be modified.

The flexibility of using different media items depending on a request allows the reuse of media items (e.g., when a media item is selected for use with two or more native content items) as well as allowing a Web page to maintain a consistent "look and feel" (e.g., making sure content items properly fit in a specified space). However, this means that native content items lack predefined requirements of what media items should be used. For example, there may be preferred requirements such as fonts, lengths, sizes and other attributes for media items used in native content items. TABLE 1 below includes, in an embodiment of the request processing system 100, technical requirements for different media item types.

TABLE 1

| Media Item Class (media item type) | Technical Requirements |
|---|---|
| Icon image (graphic) | 320 × 180 pixels, 128 × 128 pixels, 80 × 80 pixels |
| Logo image (graphic) | 128 × 128 pixels, 80 × 80 pixels, 48 × 48 pixels |

TABLE 1-continued

| Media Item Class (media item type) | Technical Requirements |
|---|---|
| Main image (graphic) | 1200 × 627 pixels, 1000 × 750 pixels, 600 × 314 pixels, 300 × 157 pixels |
| Title (text) | 25 characters, 20 characters |
| Call to action (text) | 25 characters, 15 characters |
| Sponsor (text) | 25 characters |
| Description (text) | 100 characters, 90 characters, 72 characters |
| Video | video duration (e.g., 15 seconds, 30 seconds, 1 minute, or other time); video bitrate; video aspect ratio; supported media file format (e.g., mp4, WebM, others) |

If a content provider includes media items that comply with these requirements, then the chances of the content provider being able to properly respond to requests will increase. Since the technical requirements presented above are merely suggestions, however, conforming to these requirements may still mean that the content provider may not satisfy all possible requirements.

Further, native content items may be subject to a higher failure rate than other types of content items generated in response to a request. This is because the time to select media items to produce a content item for a dynamically published Web page is the same or similar to non-dynamically published Web pages. By reducing the time and computing resources needed by the request processing system 100 to determine whether content item campaigns comply with requirements, this may increase the chance of timely selecting content items in response to a requests.

2.0 Structural Overview

FIG. 1 illustrates a request processing system 100 in which one or more of techniques described herein may be practiced according to certain embodiments. The request processing system 100 is a computer-based system. The various components of the request processing system 100 are implemented at least partially by hardware at one or more computing devices, such as one or more hardware processors executing instructions stored in one or more memories for performing various functions described herein. For example, descriptions of various components (or modules) as described in this application may be interpreted as providing pseudocode, an informal high-level description of one or more computer structures. The descriptions of the components may be converted into software code, including code executable by an electronic processor. The request processing system 100 illustrates only one of many possible arrangements of components configured to perform the functionality described herein. Other arrangements may include fewer or different components, and the division of work between the components may vary depending on the arrangement.

The request processing system 100 includes three separate systems that may operate in tandem or separately in the request processing system 100 to select content items: a request filtration system 102, a content item generation system 104, and a media item cache manager system 106. Although these systems include components divided into separate systems, the systems may communicate with each other or use information generated by other systems, or components within each system may be rearranged differently than the arrangements shown in FIG. 1. Further, different embodiments of the request processing system 100 may include one, two, or all three of these systems, in different combinations, depending on specific needs of the request processing system 100.

The request filtration system 102 may be responsible for reducing load in the request processing system 100, by reducing the number of requests to which the request processing system 100 responds. For example, the request filtration system 102 implements techniques to reduce load on a downstream service by filtering requests before they are processed by the downstream service. The request filtration system 102 may be used by the request processing system 100 to eliminate requests that satisfy one or more filters. Each filter may specify one or more attributes that may apply to one or more requests. If a request satisfies any applicable filter, then the request is not considered by the downstream service or a content item does not need to be selected by the request processing system 100 in response to the request.

An example of the request filtration system 102 that may be used with the request processing system 100 is described in the related U.S. Patent Application titled "Reducing Load to Downstream Services by Filtering Requests," as identified above in the Related Cases section of this application.

The media item cache manager system 106 may be responsible for storing, in a cache memory (and retrieving from the cache memory), media items that may be used to generate content items in the request processing system 100.

An example of the media item cache manager system 106 that may be used with the request processing system 100 is described in the related U.S. Patent Application titled "Using Status Indicators in an Item Caching Environment," as identified above in the Related Cases section of this application.

A content item exchange 108 represents an entity that supplies requests of content items to the request processing system 100. Requests for content items may come from one or more publishers. A publisher is an entity that contains inventory where content items may be displayed and that interacts with the content item exchange 108 over a network. For example, if a user attempts to access a Web page or application that requests content from an online source, the online source may contact a publisher that, in turn, communicates, over a network to the content item exchange 108, a request from the user for a content item.

In an embodiment, the content item exchange 108 may be a third-party exchange. The third-party exchange is an exchange that is controlled and managed by an entity different than an entity that operates the request processing system 100. This means that, apart from the request processing system 100, request information may be provided to other systems. For example, the content item exchange 108 may contact one or more request processing systems other than the request processing system 100 to determine what content items may be returned in response to the request.

There may be one or more content item exchanges that provide requests to the request processing system 100 that are not shown in FIG. 1. Each content item exchange may provide, to the request processing system 100, requests for one or more different media item types. For example, the content item exchange 108 may be a real-time bidding (RTB) content item exchange. The RTB content item exchange allows different parties to bid for impressions on one or more Web pages. A winner of a bid obtains the right to include the winner's content item on the one or more Web pages. The winner of the bid may be any party that offers that highest value to the content item exchange 108, such as revenue, content item suitability, or other factors determined by the content item exchange 108. One content item exchange may provide requests for video, text, graphical, native video, native text, native graphical, or any combination of these media item types.

A content item provider 110 represents an entity that supplies content items that may be selected for display in response to a request. Different entities may be content item providers. Some examples of entities include organizations, advertisers, persons, companies, and many other types of entities. The content item provider 110 may provide various pieces of information to generate content items, such as media items that are put together to form a content item, or complete content items themselves. The content item provider 110 may provide one or more media items of different types. Some examples of types of media items include audio, image, text, or video. Media items may also be associated with different types that define where they may be used in a content item and different media item types may be used for each type. For example, for a logo field, an image media item may be required, while for a company name, a text media item may be required.

The content item generation system 104 is responsible for selecting and identifying content items to return in response to a request. For example, the content item generation system 104 may separate requirements included with a request into first and second sets of requirements. The first set of requirements may be used to identify which content items or content item campaigns may be suitable to respond to the request. The second set of requirements may be used to determine whether items associated with the selected content items or content item campaigns correspond to technical requirements associated with (e.g., specified in) the request. For example, different content item exchanges may be associated with different technical requirements. As another example, different requests from the same content item exchange may specify different technical requirements.

A requirements separator component 112 is responsible for determining, of the requirements included with a request, which should be considered first (e.g., first set of requirements) and which may be considered later (e.g., second set of requirements). The requirements separator component 112 may employ rules that identify what information from the request corresponds to a requirement and, once a requirement is identified, whether the requirement should belong to the first or second sets of requirements.

For example, a request for a native content item may include at least two sets of requirements. In an embodiment, the content item generation system 104 divides requirements for a request into (1) first requirements specifying targeting information for the content item and (2) second requirements specifying media item requirements. For example, a request may include (a) targeting information specifying that the request was made from a 25-year-old in California and (b) media item requirements that a logo media item of a graphic type with particular dimension and a title media item of a text type that is less than a particular maximum length are required. In this example, the first requirements may include user information (e.g., 25-year old, in California) and the second requirements may include media item information (e.g., title and logo media item classes required). As another example of a possible requirement included with the first requirements, this may include geographic information (e.g., IP address, Bluetooth beacon, global positioning satellite), login information associated with the entity that made the request (e.g., membership information with a service), or many other types of targeting information.

Alternate embodiments may include different criteria in determining which set of requirements a specific requirement may be. In an embodiment, the first requirements may include targeting information and whether certain media items of a particular class are available and the second requirements may include specific details about the media items in the specific class. For example, a request may include dividing the first requirements including specifying an image, description, and title are required, but specify as part of the second requirements that the image must be 80 by 80 pixels in size, the description must be 50 characters or less, or the title must be 15 characters or less.

Although embodiments of the content item generation system 104 are described as dividing requirements into two sets, alternate embodiments of the content item generation system 104 may divide requirements into more than two sets, such as three sets, four sets, or more. The greater the number of sets, the most granularity the content item generation system 104 may have when determining whether content items may be used to respond to the request.

A content item campaign selector component 114 is responsible for determining, from among multiple content item campaigns provided by the content item provider 110 (or multiple content item providers), whether one or more content item campaigns may satisfy the requirements. For example, the content item campaign selector component 114 may use the first set of requirements determined by the requirements separator component 112 to determine whether one or more content item campaigns satisfy the first set of requirements.

A media item selector component 116 is responsible for determining, from among one or more media items associated with a content item campaign, whether one or more content item campaigns may satisfy the requirements. For example, the media item selector component 116 may use the second set of requirements determined by the requirements separator component 112 to determine whether one or more content item campaigns identified by the content item campaign selector component 114 may satisfy the second set of requirements.

A media item requestor component 118 is responsible for determining, when provided information identifying a particular media item, how to retrieve information on the particular media item. For example, the media item requestor component 118 may identify where the particular media item may be retrieved. Media item information may be retrieved from a variety of sources. In an embodiment, the media item requestor component 118 may use metadata associated with a particular media item to determine where to retrieve additional information on the particular media item. Information on the particular media item may be retrieved from a media item data store 120 or using a cache requestor component 122. The media item data store 120 may include one or more campaign-specific media items.

The cache requestor component 122 is responsible for determining, based on provided metadata, how to retrieve information for a particular media item. For example, the cache requestor component 122 may use features provided by the media item cache manager system 106 to retrieve media item information. The content item generation system 104 may also prioritize lookups for information on the media item based on the different sources. For example, the content item generation system 104 may use the cache requestor component 122 before performing a lookup at the media item data store 120.

The content item campaign selector component 114 may be referred to as a first service and the media item selector component 116 and the media item requestor component 118 may be referred to as a second service. A service represents an executing instance of code to perform various functions provided in the content item generation system 104 (e.g., determining compliance with first or second sets of requirements). Although components 114, 116, and 118 are shown as being included in the content item generation system 104, these may be software services executing on one or more different computing devices. For example, the content item generation system 104 may perform system calls for the components 114, 116, or 118 to evaluate one or more requirements information. For example, a first call may be to a first service including the content item campaign selector component 114. The first call may include one or more of the first set of requirements determined by the requirements separator component 112. The first call may result in returning, based on the first call, a response identifying one or more content item campaigns that satisfy the first set of requirements. Based at least in part on the one or more content item campaigns that satisfy the first set of requirements, a second call is made to a second service that includes the media item selector component 116 and the media item requestor component 118. The second call may result in returning, based on the second call, a response identifying whether the one or more content item campaigns may satisfy the second set of requirements.

A fallback component 126 is an optional component that is responsible for the selection of a fallback media item, when a media item that satisfies all the requirements for the media item cannot be found. There may be a table included in the content item generation system 104 that specifies, for each specified class for a content item, one or more other classes that may potentially be used to substitute the specified class. For example, the specified class may be related to a shared media item type with the specified class. For example, if a heading is too short (text media item type), the content item generation system 104 may choose another type with a text media item type to substitute (e.g., comments, description, call to action) or vice versa.

An optional media item modifier component 128 is responsible for, when a media item is selected, determining whether the selected media item may be modified to accommodate one or more requirements. An example of modifying a media item of text media item type may include removing one or more words (e.g., from a description or a title) or abbreviating words. For example, one or more vowels may be removed from the media item to accommodate a requirement for a shorter media item. The media item modifier component 128 may, after creating a modified media item, store the modified media item, so that it may be used as part of a response to a request.

An example of modifying a graphic media item type is trimming one or more edges of a graphic media item. For example, if an image is too long, then one or both the left and right edges of the image may be modified. The media item modifier component 128 may use a prediction model to determine whether an edge of an image may be modified. For example, if the edge is a solid color or the same color as the background color, then the media item modifier component 128 may recognize whether changes at a particular edge would or would not affect whether the media item may be usable. If it would not affect whether the media item may be usable, then a modified version of the media item may be used.

As another example, the second set of requirements specifies that a media item class of headline is required. However, none of the headline media items associated with the content item campaign complies (e.g., the content item campaign fails to include a media item of class headline or media items of the headline class fail one or more requirements). The content item generation system 104 may determine that the media item class for headline is a text media item type. The content item generation system 104 may consider whether there are fallbacks for the media item class, such as another media item class with the same media item type. For example, a media item of class comment may also be of the text media item type and may be substituted for media item of class headline.

The media item modifier component 128 may be used in conjunction with or separately from the fallback component 126. For example, the media item modifier component 128 may analyze a selected media before the fallback component 126 or vice versa.

3.0 Example Method for Multi-Step Validation of Content Items

Figure 2:
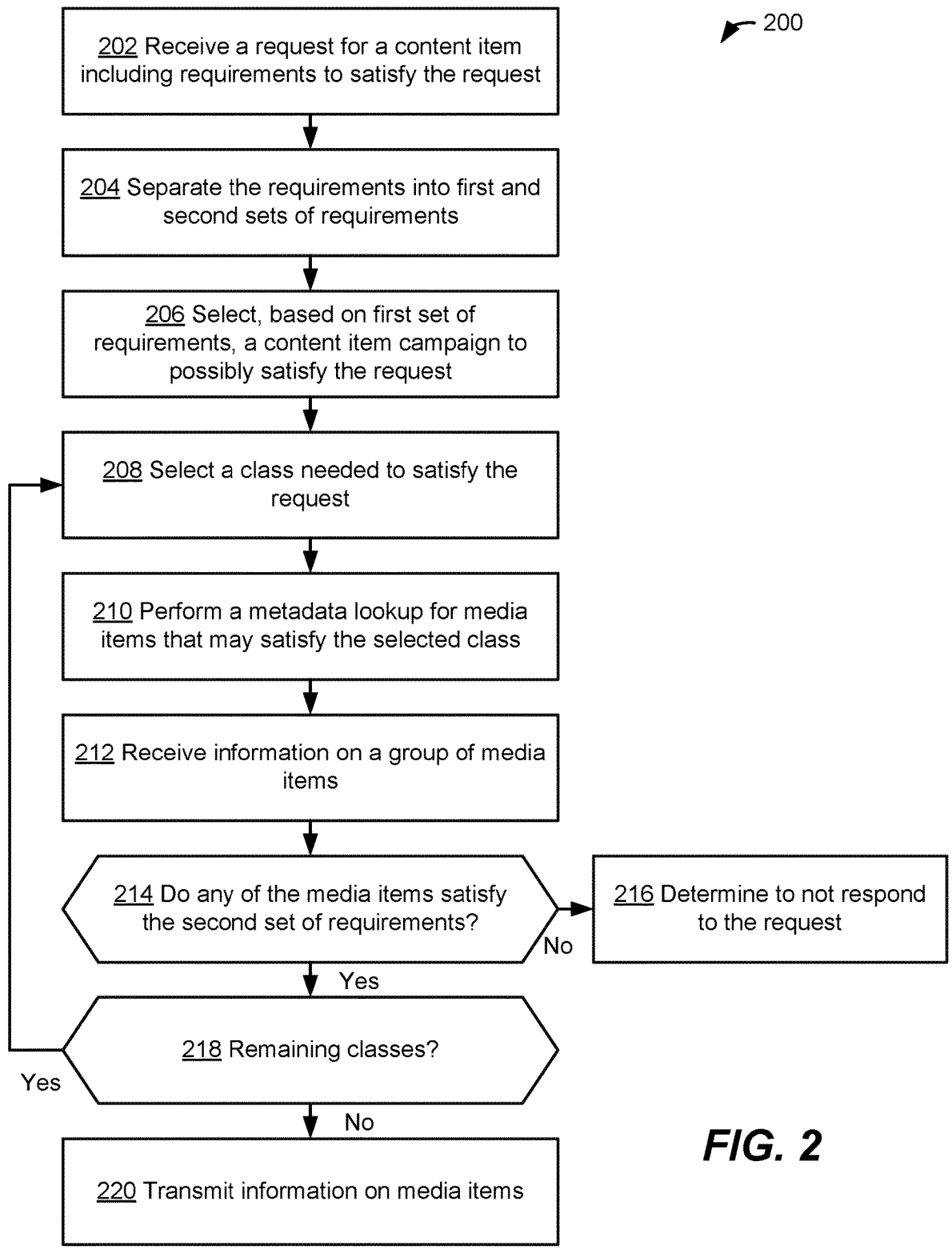
FIG. 2 is a flow that illustrates an example method for multi-step validation of content items in the content item generation system.
Figure 3:
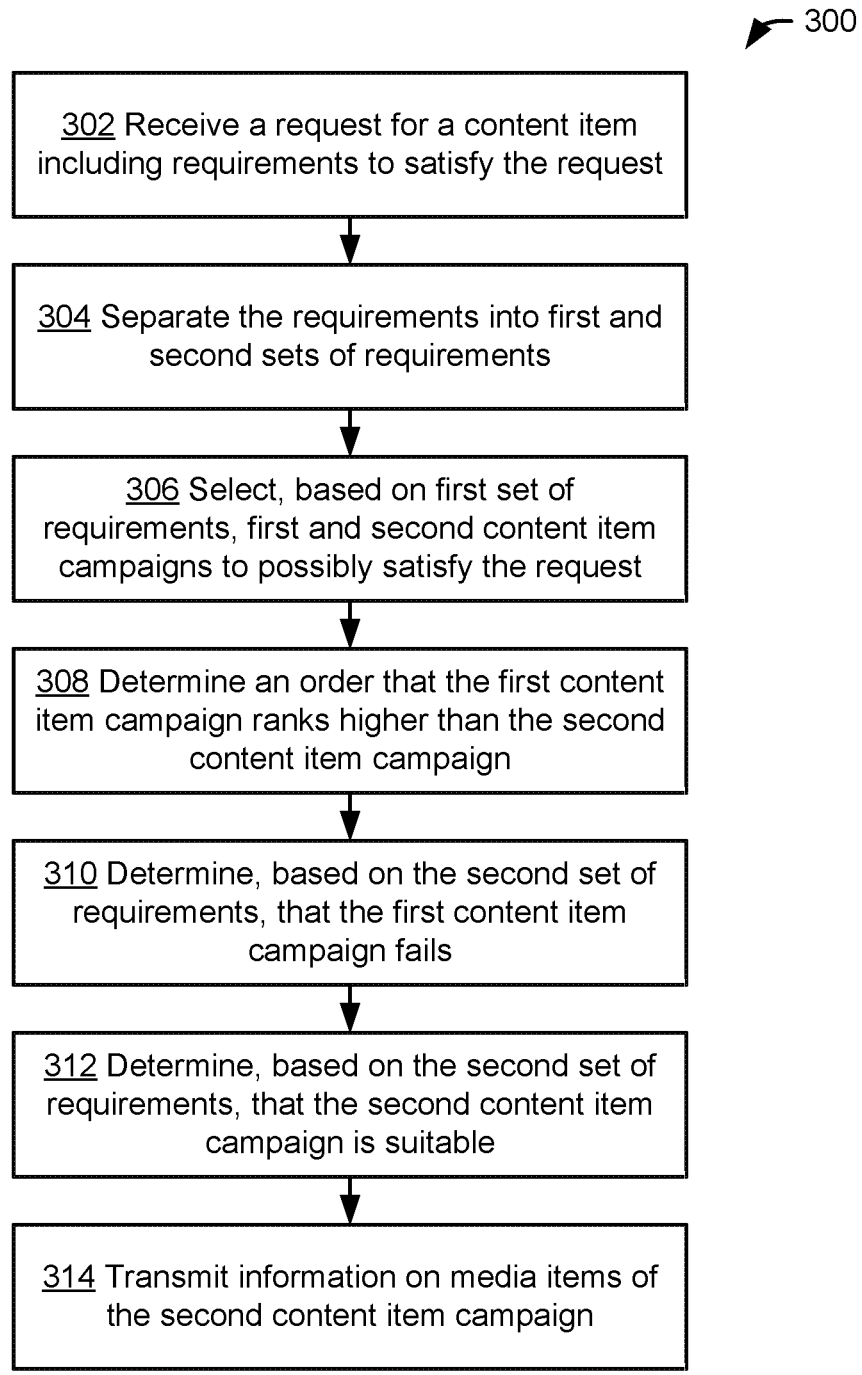
FIG. 3 is a flow that illustrates an example method for selecting multiple content items in response to a request in the content item generation system.

For purposes of illustrating a clear example, FIGS. 2 and 3 are described herein in the context of FIG. 1, but the broad principles of FIGS. 2 and 3 can be applied to other systems having configurations other than as shown in FIG. 1. Further, FIGS. 2 and 3 illustrate an algorithm or plan that may be used as a basis for programming one or more of the components of FIG. 1 that relate to the functions that are illustrated in the diagram, using a programming development environment or programming language that is deemed suitable for the task. Thus, FIGS. 2 and 3 are intended as an illustration at the level at which skilled persons, in the art to which this disclosure pertains, communicate with one another to describe and implement algorithms using programming. This diagram is not intended to illustrate every instruction, method object or sub step that would be needed to program every aspect of a working program, but are provided at the high, functional level of illustration that is normally used at the high level of skill in this art to communicate the basis of developing working programs.

FIG. 2 is a flow 200 that illustrates an example method for multi-step validation of content items in the content item generation system 104. In step 202, the content item generation system 104 receives a request for a content item including requirements to satisfy the request. The request may include a variety of information, such as information on targeting information on an entity that made the request, where selected content items may appear, or technical requirements needed to satisfy the request.

In step 204, the content item generation system 104 separates the requirements into first and second sets of requirements. This may include converting, from a request format used by the exchange (exchange-specific) into a content item generation system 104 (content item generation system-specific) format that may be used by the content item generation system 104 and any components/services within the content item generation system 104. There may exist differences between how the same or similar pieces of information stored in the exchange-specific and the content item generation system-specific formats stores information. For example, the exchange-specific and the content item generation system-specific formats may include different semantic requirements, such as different executable languages or meanings of characters used, to express similar requirements. As another example, the exchange-specific and the content item generation system-specific formats may include different ordering of information. For example, one format may choose to include the first set of requirements nearer the beginning of requirements information than the other format.

As part of the translation, requirement information from the request is identified as either a requirement for the first set of requirements or the second set of requirements. The first set of requirements are requirements that are evaluated before the second set of requirements. The first and second sets of requirements may be divided using different methods. For example, the first set of requirements may be requirements used to identify whether a content item campaign would be a good candidate for responding to the request. Some examples of factors that may be considered with or in conjunction with the first set of requirements include demographic, geographic, interests, resource amount associated with a specific content item campaign, when a content item campaign was last used by the content item generation system 104, when the content item campaign was last selected for a user, or other targeting information. The second set of requirements may be requirements that define, for whichever content item campaign is selected, what kinds of media items (e.g., classes and/or types) would need to be returned that are associated with the particular content item campaign in order to satisfy the request.

In step 206, the content item generation system 104 selects, based on the first set of requirements, a content item campaign to possibly satisfy the request. For example, the first set of requirements may be requirements related to a source of the request. This may include demographic, geographic, interests, or other targeting information of a user from which the request originates. As another example, the first set of requirements may include a user identifier that the request processing system 100 uses to look up profile information that was provided by the user and/or derived based on the user's online activity. As another example, the first set of requirements may include (a) an identifier of a publisher that will display, on the user's computing device, a content item for the request, (b) indication of the type of content that will be displayed concurrently and adjacent to the content item, and/or (c) geographic information related to the content, the publisher, and/or the user.

If the selected content item campaign is associated with multiple content items, then step 206 may involve selecting one of the content items. Regardless of whether there are multiple content items associated with a content item campaign, each content item is associated with one or more media items.

In step 208, the content item generation system 104 selects a class for a media item needed to satisfy the request. The request may be associated with one or more classes. In order to satisfy the request, a valid media item that corresponds to each of the classes (or a substitute for one or more of the classes) needs to be identified. For example, the request may specify that media items of classes headline and comment are needed to respond to the request.

In step 210, the content item generation system 104 performs a metadata lookup for media items that may satisfy the selected class. The metadata lookup may be performed by any suitable means, such as a table lookup, a data source lookup, or other methods. For example, one of the requirements of the second set of requirements may specify that a particular media item corresponding to a selected class is needed. However, there may be more than one media item corresponding to the selected class associated with a single content item campaign. The metadata lookup returns a group of media items that correspond with a requirement of the second set of requirements. The content item generation system 104 determines, by the second service, based on the second set of requirements, whether a media item in the group of media items may be used to satisfy the request. For example, in addition to complying with the selected class, the media item must comply with additional requirements specified by the second set of requirements, such as size, length, character count, or any other requirements. Not all the second set of requirements may be directed to the same media item. For example, some requirements of the second set of requirements may be directed to one media item class, while other requirements are directed to another media item class.

In step 212, the content item generation system 104 receives information on a group of media items that qualify as belonging to the selected class. For example, if the class corresponds to a logo, there may be more than one logo associated with a content item campaign. Each logo may include the same material or content as other logos, but each logo is different in size or other aspect. For example, a logo may include a bird, tree, geometric shape, or other object. Each logo may include the same object, but in different dimensions. Some logos may be longer, shorter, taller, or have other differences from each other.

In step 214, the content item generation system 104 determines whether any of the media items satisfy the second set of requirements. For example, of the media items received in the step 212, the content item generation system 104 determines whether dimensions, size, or other requirements are met by the media items. The second set of requirements may include more than one requirement for one or more of the media items, such as a height and a length requirements. If none of the media items satisfy the second set of requirements, then in step 216, the content item generation system 104 determines to not respond to the request, at least with respect to the content item campaign selected in step 206. If another content item campaign satisfies the first set of requirements, then steps 208-214 may be repeated for that other content item campaign.

If there is a media item that satisfies the second set of requirements, then, in step 218, the content item generation system 104 determines whether there are any remaining classes where a media item is needed. The request may include only one class (or media item) to satisfy the request, or any number of additional media items.

If there are no additional classes, then, in step 220, the content item generation system 104 transmits information on selected media items that satisfy the second set of requirements. This may include information that identifies from where media items that satisfy the request may be retrieved.

4.0 Example Embodiment of a Content Item Generation System for Multi-Step Validation of Content Items According to one embodiment, the techniques described herein are implemented by one or more storage media storing instructions which, when executed by one or more processors, cause receiving, from a third-party content item exchange, a request that includes requirements used to select one or more content items to satisfy the request. The requirements are separated into a first set of requirements and a second set of requirements.

A first service is called to determine whether the first set of requirements correspond to targeting criteria established by a content item campaign, where the targeting criteria specifies whether the content item campaign should be used to generate a content item in response to requests. For example, the first service may perform a query including one or more requirements of the first set of requirements to determine whether a particular content item campaign may be used to satisfy the request. The first service may return one or more identifiers that uniquely identify the one or more content item campaigns as possibly able to comply with the request.

In response to the content item campaign being selected to possibly satisfy the request, the content item generation system 104 performs a metadata lookup by a second service for two or more media items associated with the content item campaign that possibly satisfies one or more requirements of the second set of requirements.

If the content item campaign satisfies the requirements included with the request, information on the content item campaign may be transmitted to the third-party content item exchange. For example, such information may include identifying information on the content item campaign, information on where one or more of media items associated with the content item campaign may be retrieved, information where a content item generated based on the identified media items is stored, or a content item itself.

In an embodiment, if none of the media items of the group of media items can satisfy the request, then the content item generation system 104 may determine to not provide a response to the request that identifies a content item campaign. For example, if the group of media items fails to meet a requirement of the second set of requirements, then the content item generation system 104 may determine to not return a content item campaign in response to the request. The content item generation system 104 may provide other indications in response to the request, such as a response indicating that none of the content item campaigns comply with all the requirements of the request.

In various embodiments, the content item generation system 104 calls the second service for a particular content item campaign, only if the particular content item campaign complies with the requirements of the first set of requirements. For example, if the particular content item campaign fails one or more requirements of the first set of requirements, then none of the requirements of the second set of requirements need to be considered in regards to the particular content item campaign or the second service does not need to be called in response to the request for the particular content item campaign.

In various embodiments, the content item generation system 104 first selects the content item campaign using the first set of requirements, which is separate from considering whether the content item campaign complies with the second requirements. For example, selecting the content item campaign to possibly satisfy the request includes determining that the first set of requirements is satisfied without considering whether any of requirements in the second set of requirements are satisfied.

In an embodiment, the content item generation system 104 includes a fallback process, which determines potential fallback media items to use when there is not a media item that complies with all relevant requirements of the second set of requirements.

In an embodiment, the content item generation system 104 may modify media items to comply with one or more requirements of the second set of requirements on-the-fly to respond to the request. For example, if the content item generation system 104 selects a particular media item of the group of media items that complies with some of the requirements of the second set of requirements (e.g., a media item class) but not all the requirements for the media item, then the content item generation system 104 may determine whether it is possible to modify the particular media item, to comply with the second set of requirements. For example, the content item generation system 104 may modify a height attribute, a length attribute, or a duration attribute of the particular media item to comply with a requirement of the second set of requirements.

In an embodiment, the content item generation system 104 may order or sort media items of the same class, so that the content item generation system 104 may more efficiently determine which media item in the group of media items may be used to comply with the request. For example, before determining whether the media item in the group of media items may be used to satisfy the request, the content item generation system 104 sorts the group of media items by at least one of a height attribute, a length attribute, or a duration attribute. Based on the media item being placed at the start of the sorted group of media items, the media item is considered first to determine whether it complies with the second set of requirements. If the media item does not comply with the second set of requirements, then the next media item of the sorted group of media items may be considered, unless it is impossible for the next media item to satisfy at least one requirement in the second set of requirements. For example, if a logo requirement is a maximum height of 20 pixels, the available logos for the content item campaign are sorted from shortest to tallest in terms of pixel height, and the shortest available logo for the content item campaign is 30 pixels, then the other logos would necessarily fail to satisfy the maximum height requirement. Nevertheless, in this example, one of the logos may be modified to shrink one of the logos, if allowed.

5.0 Example Method for Selecting Multiple Content Items in Response to a Request FIG. 3 is a flow 300 that illustrates an example method for selecting multiple content items in response to a request in the content item generation system 104. In step 302, the content item generation system 104 receives, from content item exchange 108, a request for a content item, where the request includes requirements to satisfy the request. In step 304, the content item generation system 104 separates the requirements into first and second sets of requirements. In step 306, the content item generation system 104 selects, based on the first set of requirements, first and second content item campaigns to possibly satisfy the request. For example, the first set of requirements may include demographic, geographic, interests, or other targeting information for a user from which the request originates. Instead of selecting only one content item campaign (e.g., the highest value, the first content item campaign that satisfied the first requirements, or the first content item campaign in a list of content item campaigns), more than one content item campaign is selected.

In step 308, the content item generation system 104 determines an order that the first content item campaign ranks higher than the second content item campaign. For example, the first content item campaign may be more suitable than the second content item campaign based on the first set of requirements, the first content item campaign is associated with a higher resource amount (e.g., a payoff amount), a higher quality rating, or any combination of these.

In step 310, the content item generation system 104 determines, based on the second set of requirements, that the first content item campaign fails. For example, the first content item campaign may lack a media item corresponding to a media item class required in the second set of requirements, may lack sizing or other technical requirement for a required media item, or for other reasons.

In step 312, the content item generation system 104 determines, based on the second set of requirements, that the second content item campaign is suitable. For example, for a particular requirement of the second set of requirements, the first content item campaign fails, but the second content item campaign may satisfy.

In step 314, the content item generation system 104 transmits, in response to the request, to content item exchange 108, information on media items of the second content item campaign. This may include information that identifies where media items to satisfy the request may be retrieved. Alternatively, a content item that includes the media items that satisfy the request are transmitted in response to the request.

6.0 Example Embodiment of a Content Item Generation System for Selecting Multiple Content Items in Response to a Request According to one embodiment, the techniques described herein are implemented by one or more storage media storing instructions which, when executed by one or more processors, cause receiving, from a third-party content item exchange, a request that includes requirements used to select one or more content items to satisfy the request and separating the requirements into a first and second sets of requirements. The request may be for a content item, including one or more media items. Each media item may be of different media item types, such as video, text, or graphic. The content item generation system 104 identifies, based on the first set of requirements, a first content item campaign and a second content item campaign that may be used to satisfy the request. For example, in the embodiment where the first set of requirements include targeting criteria, the first and second content item campaigns may be content item campaigns that include targeting criteria specifying that a user, such as a user that the request originates from, may be interested in content from the first and second content item campaigns.

The content item generation system 104 may determine an order that ranks the first content item campaign higher than the second content item campaign. Some examples of considered factors that result in the first content item campaign being ranked ahead of the second content item campaign may include the first content item campaign being associated with a higher resource amount (e.g., paid amount for each click, paid amount for each viewing), including targeting criteria that indicates that the first content item campaign is more suitable than the second content item campaign based on the first set of requirements, information indicating that the second content item campaign is closer to exhaustion (e.g., depletion of an associated resource amount) than the first content item campaign, the first content item campaign has been selected for the user or other users recently, a quality measurement associated with the first content item campaign is higher than a quality measurement associated with the second content item campaign, a biasing factor, or any combination of these factors. For example, the biasing factor may include a determination of when the first content item campaign was last selected for use. If the second content item campaign was selected recently or is close to exhaustion with an associated resource amount, then the biasing factor may sort the first content item campaign higher than the second content item campaign.

In an embodiment, the content item generation system 104 may determine the order independently of the second set of requirements. For example, when determining the order that the first content item campaign is before the second content item campaign, the second set of requirements are not considered. However, the order may consider, at least in part, the first set of requirements.

If the first content item campaign complies with the second set of requirements, then the first content item campaign is selected for presentation. If the first content item campaign fails to comply with at least one requirement in the second set of requirements, then the content item generation system 104 may select the second content item campaign. For example, in the embodiment where the second set of requirements are media item requirements, the content item generation system 104 may consider whether there are one or more media items associated with the first and second content item campaigns that comply with the second set of requirements.

Different embodiments of the content item generation system 104 may determine whether the first and second content item campaigns satisfy the second set of requirements using different methods. In one embodiment, the first content item campaign is analyzed to determine whether it complies with the second set of requirements. If the first content item campaign does not comply with one of the requirements, then the second content item campaign is considered to determine whether the second content item campaign complies with the second set of requirements. This may conserve resources, by reducing unnecessary consideration of content item campaigns. In another embodiment, the first and second content item campaigns are analyzed at least partially during the same time. For example, the first and second content item campaigns may be analyzed in whole or at least partially in parallel. This may increase the responsiveness of the content item generation system 104 when responding to requests, when the first content item campaign fails.

In an embodiment, failure data indicating whether, for each request (for a content item) received by request processing system 100, a first content item campaign fails the second set of requirements may be tracked. If the percentage of such first content item campaigns failing (across multiple requests that the request processing system 100 receives) is relatively high (e.g., over 30%), then the number of other content item campaigns that are analyzed in parallel (for determining whether they satisfy the second set of requirements) may increase (e.g., from 0 to 1 or from 1 to 3). In this way, the chances of being able to respond to a request increase compared to the scenario where, for a single request, content item campaigns are considered sequentially.

In yet another embodiment, the content item generation system 104 may complete determining whether the second content item campaign complies with the second set of requirements, before determining whether the first content item campaign complies with the second set of requirements. In this embodiment, the content item generation system 104 may choose to wait until determining whether the first content item campaign complies with the second set of requirements, before considering whether to select the second content item campaign.

7.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
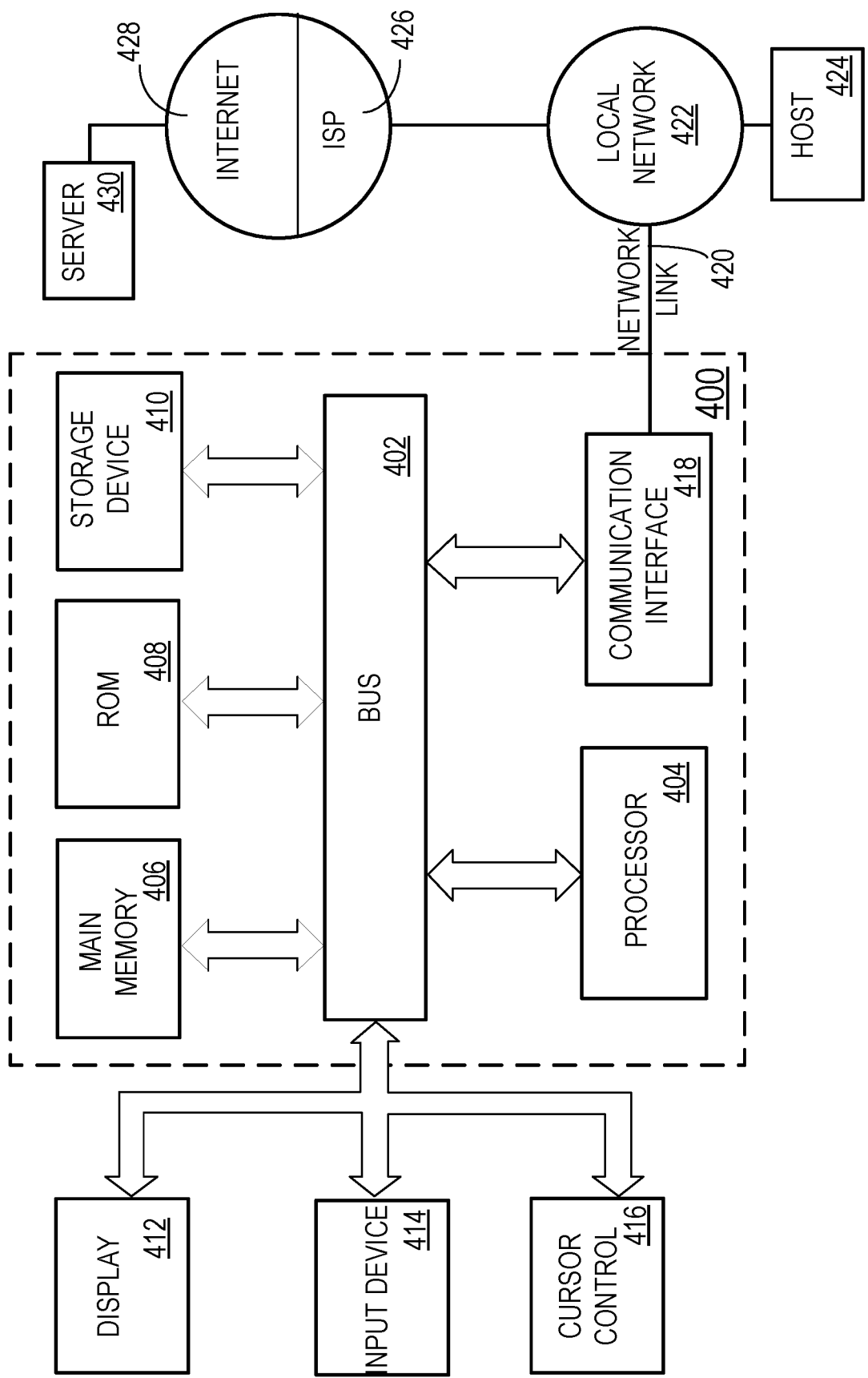
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (for example, x) and a second axis (for example, y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
storing, by a system, a plurality of content item campaigns that includes (1) a first content item campaign that includes first targeting criteria selected by a first content provider and (2) a second content item campaign that includes second targeting criteria selected by a second content provider that is different than the first content provider;
receiving, by the system, from a third-party content item exchange that is remote relative to the system, a request that includes a plurality of requirements used to select one or more content items to satisfy the request;
wherein the request is initiated by a client device that is remote relative to the third-party content item exchange and the system;
separating the plurality of requirements into a first set of requirements and a second set of requirements;
identifying, based on the first set of requirements, the first content item campaign and the second content item campaign that satisfy the first set of requirements;
determining an order that ranks the first content item campaign higher than the second content item campaign;
after identifying, based on the first set of requirements, the first content item campaign and the second content item campaign, determining whether the first content item campaign and the second content item campaign satisfy the second set of requirements;
in response to determining that the first content item campaign fails to comply with at least one requirement of the second set of requirements and that the second content item campaign complies with the second set of requirements, selecting the second content item campaign and not the first content item campaign; and
in response to selecting the second content item campaign, causing, by the system, information from the second content item campaign to be provided to the third-party content item exchange;
wherein the method is performed by one or more computing devices.

2. The method of claim 1, wherein determining the order comprises ranking the first content item campaign higher than the second content item campaign, without considering the second set of requirements.

3. The method of claim 1, wherein the request comprises a request for a media item data type of video, text, or graphic.

4. The method of claim 1, wherein the second set of requirements includes at least one requirement that a valid media item, among a plurality of media items that together constitute a content item of a content item campaign, corresponds to a specified media item class and an associated size for the valid media item.

5. The method of claim 1, wherein the second content item campaign is associated with a lower resource amount than the first content item campaign.

6. The method of claim 1, wherein the second content item campaign is associated with a lower quality metric than the first content item campaign.

7. The method of claim 1, wherein the first content item campaign is ranked higher than the second content item campaign due to a biasing factor.

8. The method of claim 1, further comprising:
causing to be displayed at a user's computing device a content item that comprises a plurality of media items, based on the information from the second content item campaign provided to the third-party content item exchange.

9. The method of claim 1, wherein the first set of requirements comprises one or more targeting criteria used to select the first and second content item campaigns.

10. The method of claim 1, wherein the second set of requirements comprises one or more requirements for a spatial length or a spatial height of a media item.

11. The method of claim 1, wherein the second content item campaign is associated with a plurality of campaign-specific media items stored at one or more data stores and the plurality of campaign-specific media items may be selected to generate one or more content items for the second content item campaign.

12. The method of claim 1, wherein second set of requirements includes multiple requirements, wherein determining that the first content item campaign fails to comply with the at least one requirement of the second set of requirements comprises:
determining, for each requirement of the second set of requirements, whether there is at least one media item, associated with the first content item campaign, that satisfies said each requirement.

13. The method of claim 1, wherein:
identifying, based on the first set of requirements, the first content item campaign and the second content item campaign comprises calling a first service, supplied with the first set of requirements, to identify the first content item campaign and the second content item campaign, and
determining that the first content item campaign fails to comply with at least one requirement of the second set of requirements and that the second content item campaign complies with the second set of requirements comprises calling a second service, supplied with the second set of requirements, to determine that the first content item campaign fails to comply with at least one requirement of the second set of requirements and that the second content item campaign complies with the second set of requirements.

14. The method of claim 1, further comprising:
after determining the order, evaluating whether the first content item campaign and the second content item campaign comply with the second set of requirements, wherein evaluating the first content item campaign and the second content item campaign occurs at least in part at the same time.

15. The method of claim 1, further comprising:
after determining the order, evaluating whether the first content item campaign and the second content item campaign comply with the second set of requirements;
in response to determining that the second content item campaign complies with the second set of requirements is completed before determining that the first content item campaign fails to comply with at least one requirement of the second set of requirements, determining to wait until the determination that the first content item campaign fails to comply with at least one requirement of the second set of requirements is completed.

16. The method of claim 1, wherein the second set of requirements includes a first limit on a size for a first media item class and a second limit on a size for a second media item class that is different than the first media item class.

17. One or more storage media storing instructions which, when executed by one or more processors, cause:
   receiving, by a system, from a third-party content item exchange that is remote relative to the system, a request that includes a plurality of requirements used to select one or more content items to satisfy the request;
   wherein the request is initiated by a client device that is remote relative to the third-party content item exchange and the system;
   separating the plurality of requirements into a first set of requirements and a second set of requirements;
   identifying, based on the first set of requirements, a first content item campaign and a second content item campaign that satisfy the first set of requirements;
   after identifying, based on the first set of requirements, the first content item campaign and the second content item campaign, determining whether the first content item campaign and the second content item campaign satisfy the second set of requirements;
   in response to determining that the first content item campaign fails to comply with at least one requirement of the second set of requirements and that the second content item campaign complies with the second set of requirements, selecting the second content item campaign and not the first content item campaign;
   wherein the second set of requirements includes at least one requirement that a valid media item corresponds to a specified media item class and an associated size for the valid media item; and
   in response to selecting the second content item campaign, causing, by the system, information from the second content item campaign to be provided to the third-party content item exchange.

18. The one or more storage media of claim 17, wherein the instructions, when executed by the one or more processors, further cause ranking the first content item campaign higher than the second content item campaign prior to considering the second set of requirements.

19. The one or more storage media of claim 17, wherein:
   the first content item campaign includes one or more content items and one or more targeting criteria that are separate from the one or more content items, that are specified by a third-party content provider, and that are used to determine whether at least one of the one or more content items will be provided to computing devices in response to requests for content items;
   the third-party content item exchange selects, in response to a particular request initiated by a user's computing device that is separate from the third-party content item exchange, a particular content item from among a plurality of content items provided by different request processing systems that includes the system.

20. The one or more storage media of claim 17, wherein the second set of requirements comprises one or more requirements for a spatial length or a spatial height of a media item.

* * * * *